United States Patent

[11] 3,581,285

[72] Inventors Farid J. Neema Sudbury; Robert C. Engelhardt, Watertown, both of, Mass.
[21] Appl. No. 777,442
[22] Filed Nov. 20, 1968
[45] Patented May 25, 1971
[73] Assignee Honeywell Inc. Minneapolis, Minn.

[54] KEYBOARD TO MEMORY PERIPHERAL DEVICE
12 Claims, 6 Drawing Figs.

[52] U.S. Cl. 340/172.5
[51] Int. Cl. G06f 13/00, G06f 3/10
[50] Field of Search 340/172.5; 235/157

[56] References Cited

UNITED STATES PATENTS

| | | | |
|---|---|---|---|
| 2,379,862 | 7/1945 | Bush | 340/172.5 |
| 3,289,169 | 11/1966 | Marosz | 340/172.5 |
| 3,315,234 | 4/1967 | Ruth | 340/172.5 |
| 3,388,384 | 6/1968 | Bogert et al. | 340/172.5 |

*Primary Examiner*—Paul J. Henon
*Assistant Examiner*—Mark Edward Nusbaum
*Attorneys*—Fred Jacob and W. Hugo Liepmann

ABSTRACT: A data recording device is disclosed for entering data into a memory field via a keyboard and for right justifying the entered data in the memory field. The device includes a keyboard with which data is entered, a buffer memory and register that assemble and right justify the data; and a file memory, such as a magnetic tape recorder into which the data is finally recorded. Flag bits stored in the buffer memory, each one associated with a data character, are used for housekeeping purposes to keep track of the location of selected data and to control the right justification sequencing.

FARID NEEMA
ROBERT ENGELHARDT
INVENTORS

BY W. Hugo Liepmann
ATTORNEY

FARID NEEMA
ROBERT ENGELHARDT
INVENTORS

BY W. Hugo Liepmann

FARID NEEMA
ROBERT ENGELHARDT
INVENTORS

BY W. Hugo Liepmann
ATTORNEY

KEYBOARD TO MEMORY PERIPHERAL DEVICE

BACKGROUND

This invention relates generally to a keyboard to memory device and is more particularly concerned with a method and apparatus for providing automatic right justification in such a device.

Keyboard to memory devices provide a means for storing keyed data in machine retrievable form. Generally speaking, such devices include a keyboard, buffer memory and file memory. Specific examples of file memories include magnetic tape equipment, magnetic disc or drum equipment, punched card or tape equipment, and various transmission equipment. The provision of a buffer memory in a keyboard to memory device permits error correction to take place before transmission of the data, and before entry of the data to the file memory.

When the contents of the buffer memory are transferred, it is usually a nondestruct transfer. This type of transfer is advantageous in the duplicate mode of operation where it is desirable to duplicate a portion of a previous record. An operator, aware of a duplication of a previous record field, depresses a duplicate button that retains, in the particular memory record field, the previous data already stored in the buffer memory and not destroyed in the previous transfer.

A still further advantage of such a buffered system is that a record can be verified readily after it is entered into the file memory, and corrected if the need arises. This is done by rekeying the record from the source document and comparing this data with the contents of the buffer memory which had previously been transferred from the file memory. Hence, a buffer memory greatly facilitates verification.

Buffer memories have been used in keypunch equipment and key-to-tape equipment, and in these instances they have stored data in a format similar to that used with common punched accounting cards. Thus, just as in a punched card, the buffer memory may store 80 columns of 6-bit characters. Further, an accounting card is commonly divided into fields to separate different positions of data. In the buffer memory the boundaries of these fields are usually "programmed" by additional storage positions related to each memory column.

When numerical data is entered into the buffer memory, it is usually desirable to right justify the data within the field of entry in order to obtain the correct position significance. Positional notation indicates that a digit in one location of a multidigit number carries more of less weight than other digits. When referring to monetary amounts, for example, position significance is important. If the memory column count, i.e. the number identifying the next memory location that is to receive data, is displayed and the operator knows the extremes of the field boundaries, the operator can manually right justify the next item of data by keying the exact number of zeros ahead of the data. This is quite tedious, however, and likely to introduce error. A more desirable approach is to provide a control key which the operator can depress, after the data is key-entered, to cause the machine to right justify the data automatically. In order to do this, the machine must be able to recognize the beginning and the end of any field. It must also be capable of entering the data, right justified, in the correct memory columns within a field and of filling each remaining column in that field with a zero character.

Right justification has been available in the past in keyboard to memory devices using a buffer memory. In one prior arrangement, data is entered into a selected field within the buffer memory and, when the operator signifies right justification, the data corresponding to that particular field is shifted into, for example, a shift register or other intermediate store. Logic circuitry and/or counters then determine the number of zeros needed to fill the balance of the field. The correct, right justified data is then reloaded into the buffer memory at the appropriate memory locations. Such a system, however, has the disadvantage that the intermediate store requires capacity to store an 80-column field. The resultant large intermediate store, and the correspondingly increased circuitry necessary to determine the number of positions to fill with zeros, makes such systems impractical and costly.

OBJECTS AND SUMMARY OF THE INVENTION

In view of the foregoing, therefore, it is an object of this invention to provide, in a keyboard to memory device, automatic right justification without the use of complex additional circuitry.

It is also an additional object of this invention to provide right justification in a keyboard to memory device under the control of flag bits associated with memory locations in a buffer memory of the device. A more particular object is to use such flag bits to control the sequential moving of data in certain memory locations and the forcing of data, representative of the character zero, into other memory locations.

A further object of the invention is to provide the buffer memory of a keyboard to memory device with right justification control that uses the same indicators that are used in each buffer memory location to indicate duplicates during the verification mode of operation.

A further object of the invention is to provide right justification control without having to use intermediate storage for many data characters.

Other objects of the invention will in part be obvious and will in part appear hereinafter.

The present invention realizes these and other objects and advantages by providing equipment that uses flag bits to control right justification sequencing. The equipment tags memory columns for identification purposes during right justification processing with the same buffer memory storage element that is used to flag duplications during the verification mode. Each such dual-purpose storage element is associated with a single column. A flag-bit condition for each column is automatically stored in each such storage element when the operator keys data into each memory location assigned to that column. Thereafter, when the operator depresses the right justification control key, the buffer memory address register is incremented, for a right cycle sequence, and decremented, for a left cycle sequence, under the control of these storage elements to cycle data to the right end of the memory field and to fill the left portion of the memory field with zeros. More specifically, this right justification sequencing is controlled by sensing both the most significant memory position of a field and the states of the flag bits.

DESCRIPTION OF THE DRAWINGS

For a fuller understanding of the nature and objects of the invention, reference should be had to the following detailed description taken in connection with the accompanying drawings, in which.

DESCRIPTION OF ILLUSTRATED EMBODIMENT

Figure 1:
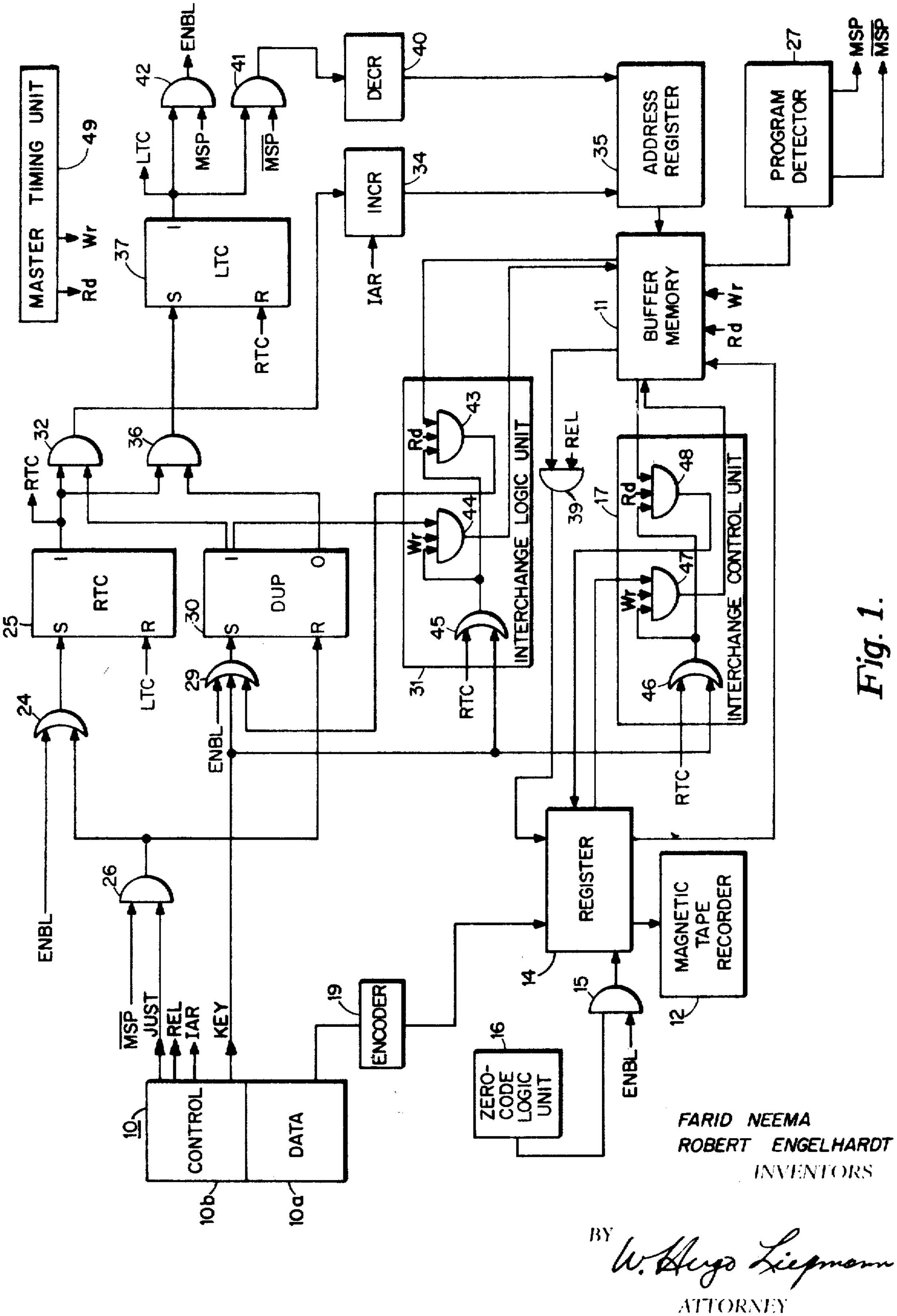
FIG. 1 is a block diagram of a keyboard to memory device embodying features of the invention.

Referring to FIG. 1, a keyboard to memory device embodying the present invention has three previously discussed components: a keyboard 10, a buffer memory 11 and a file memory 12 depicted herein as a magnetic tape recorder 12. Keyboard 10 has data keys and control keys associated respectively with a data section **10*a* and a control section 10*b***. The majority of the remainder of the diagram shows right justification sequencing circuitry.

Data is entered via keyboard 10 through register 14 to a field in buffer memory 11. Thence the device transfers the data to the file memory 12 by way of the register 14 via gate 39. Release signal REL generated at keyboard 10 enables gate 39 allowing this nondestruct serial transfer. However, when the operator depresses the right justification control key before the data has been transferred out of the buffer memory, the device commences right justifying the data in that field. Thereafter, when the data is transferred to the file memory, it is recorded in a right justified format.

In the right justifying operation, address register 35 decrements to the most significant (first) column of the buffer memory field and the contents of register 14 are interchanged with the contents of that column under control of the interchange control unit 17. Since register 14 contained a zero code this forces the zero code into the most significant column of that field.

Address register 35 then increments and the contents of register 14 and buffer memory 11 again interchange. This interchange stores the character originally in the first column into the second column, and places the character originally in the second memory buffer column in register 14. This increment and interchange operation continues, during a right cycle sequence, until a flag-bit condition indicates that all the data has been moved one position to the right in the particular field. Further increment-decrement cycles are preformed until right justification has been completed. When buffer memory 11 has been filled in this manner, its contents are transferred via register 14 to magnetic tape recorder 12.

Thus, data can be considered as flowing from keyboard 10 to encoder 19 and on to register 14, between buffer memory 11 and register 14, and from register 14 to magnetic tape recorder 12. The reason for shifting data via register 14 is to accomplish parallel transfer of a character to tape. During right justify operation, the data flow between register 14 and the buffer memory 11 is via the inter change control unit 17. The rest of the FIG. 1 system, generally speaking, controls the data flow and in particular controls the right justification sequencing of data.

Much of the circuitry associated with FIG. 1 is conventional and as such has not been shown in detail. Thus, magnetic tape recorder 12 can be any one of a variety of known recorders.

Register 14, also of conventional construction, is a storage register capable of storing a data character of, for example, 6-bit length. A zero-code logic unit 16 provides a zero code that gate 15 applies to register 14 when an ENBL signal input to the gate is true (i.e. has a true value).

By way of example, the illustrated register 14 is shift register with paralleled input from keyboard 10 and parallel output to recording heads (not shown) in recorder 12. Further, register 14 serially shifts data to buffer memory 11, and memory 11 likewise serially shifts data to register 14 via interchange control unit 17.

The arrangement of keys on keyboard 10 preferably, for purposes of familiarity, is similar to that of a conventional keypunch machine. The illustrated keyboard includes alphabetic and numeric keys, control keys, special function keys and a space bar. The character (data) keys are connected to encoder 19 which converts each data character into a different binary code. This binary code, having six bits per character in the present embodiment, is the data which recorder 12 eventually records on magnetic tape. This magnetic tape is illustrative of numerous file memory storage media.

Figure 2:
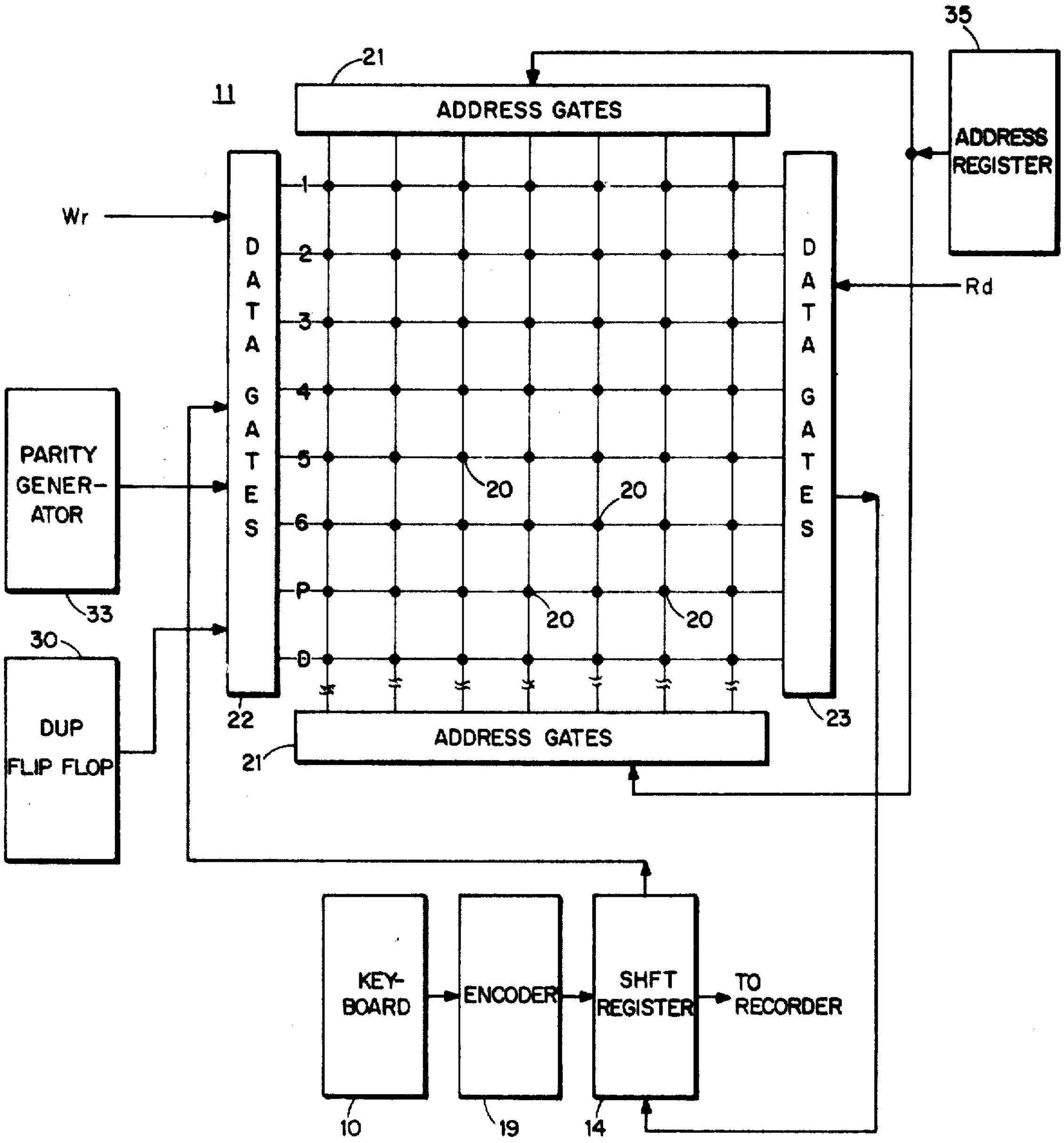
FIG. 2 is a simplified diagrammatic illustration depicting a field of a buffer memory array as used in the invention.

Memory 11 includes a rectangular array of bistable magnetic cores. FIG. 2 shows a fragment of such an array and the connection of the memory to other components of the device. That is, the configuration shown in FIG. 2 is an exemplary embodiment operative to explain the function of the present invention. Other conventional memory arrangements can, however, be substituted therefore within the scope of the invention. With reference to FIG. 2, cores 20 are arranged horizontally in rows and vertically in columns. Each column stores a single data character and hence has six cores (numbered 1—6) for the illustrated 6-bit code of the data character. A seventh core (P core) stores a parity bit and an eighth core (D core) stores a dup bit. This dup bit is also referred to as a flag bit and the two terms are used synonymously herein. Since this eighth bit serves a special additional purpose in accordance with the present invention, its use to indicate a duplicated character is noteworthy.

As also shown in FIG. 1, a master timing unit 49 is connected with keyboard 10, register 14, buffer memory 11, units 31 and 17, and other of the FIG. 1 elements to operate the keyboard to memory device according to the desired sequence. Two specific output signals from the unit 49 are a read signal R*d* and a write signal W*r* produced for every operating cycle of the buffer memory 11. As is conventional, the read signal initiates a buffer memory read operation and the subsequent write signal initiates the memory write operation.

In most keyboard to memory devices, it is conventional to use a verify procedure to ensure that the data recorded in the file memory is a true record of the source document. In a keyboard to memory device using a buffer memory, this record-verify procedure is generally as follows:

At the commencement of operation, a plurality of records of data (usually 80 characters wide) keyed into the buffer memory are serially transferred to the file memory. This is a nondestruct transfer, so that the buffer memory still contains the record after it is stored in the file memory. As the operator thereafter keys in the next document, the machine automatically records the new characters in the buffer memory in place of the characters of the prior record. However, when the next record contains, for example, a field that is the same as the corresponding field in the previously stored record, rather than key in the duplicate portions anew, the operator merely depresses a duplicate control key. This causes the machine to retain in the buffer memory the data already stored in that field. These actions occur during the automatic-duplicate data-entry mode of operation. Finally, when the new record is fully assembled in the buffer memory it is transferred to the file memory.

During the verification mode of operation, i.e. in which a record in the file memory is to be compared with the source document from which it was keyed, the operator keys the source document in anew, and this is compared to the contents of the buffer memory. When the data to be verified is a repeat of the data in the same field on the last record that the operator previously verified, instead of keying in that data again, it is simpler for the operator to depress the duplicate control key. When this key is depressed, if the dup (flag) bit recorded in the buffer memory is set for a respective column, the system automatically recognizes this as a verification. After actuation of the duplicate control key, verification by flag-bit proceeds automatically column-by-column until a nonverify signal is encountered or the process is terminated in some other way.

The above cursory explanation of the verification use of the flag bit stored in the eighth core in each column shows the usual purpose for providing these additional cores in the buffer memory 11. This use of these core elements is not critical to the present invention. However, in a preferred embodiment of this invention, these same cores are used in right justification. This double use of the flag bit raises no conflicts because, since right justification is always separate and independent from verification, they are mutually exclusive operations.

Referring again to FIGS. 1 and 2, buffer memory 11 receives from address register 35 a coded address signal identifying the location in the buffer memory from which data will be read, or into which data will be written, in the next memory transfer. FIG. 2 shows in further detail the connection of the address register to the memory buffer address gates 21, 21 which select the appropriate column of cores into and from which data is transferred. In particular, in the loading of the data into the memory 11, shift register 14 serially shifts the data via input gates 22 to the column of cores 20 selected with the address gates 21, 21 in response to the memory address register signals. FIG. 1 illustrates this transfer as being performed via the interchange control unit 17. Master timing unit 49 (FIG. 1) can, where desired, provide the timing signals for operating successive cores in the address column for this serial operation.

Conversely, during a read operation, output gates 23 of the memory provide transfer of data from a column of cores to shift register 14. Again FIG. 1 indicates that this transfer can be via the unit 17.

As also shown in FIG. 2, a parity generator 33 and a DUP flip-flop 30 are connected to the buffer memory input gates 22 to write information into the P and D cores, respectively, of the memory column which address register 35 addresses. The memory 11–DUP flip-flop interchange is shown in FIG. 1 as being through an interchange logic unit.

To simplify matters and draw attention to the inventive features of the present invention, particular memory timing and associated logic timing has not been shown in great detail; any of several conventional constructions can be used. Further, the serial arrangement of the entry and readout operations with memory 11 is not critical. The invention can be practiced with paralleled operation.

Hence, while much of the control and coding circuits of the system are conventional and have been omitted in the interest of clarity, FIG. 1 depicts in block diagram form the principal control circuits utilized in right justification according to one embodiment of the invention.

The data section **10*a* of keyboard 10 applies to the encoder 19 a signal unique to each character when the key for that character is depressed. The illustrated keyboard control section 10*b*** develops a KEY signal each time a character key is depressed. It also develops an IAR signal after the coded signals identifying a keyed character are loaded in to the buffer memory; the IAR signal precedes the keying of the next character. When the operator depresses the right justify control key, the control section produces a JUST control signal. Further, when a record is to be transferred to the file memory a release signal REL is produced either automatically or manually.

The interchange control unit 17 shown in FIG. 1 controls the interchange of data between register 14 and buffer memory 11 in response to either the KEY signal or an RTC signal. The REL input to gate 39 controls the shifting of data from memory 11 via register 14 to the file memory (recorder 12). An RTC flip-flop 25 generates the RTC signal when in the one state, which is the state that causes the right cycle sequence of the justify operation. In particular, the control unit 17 transfers the character in the addressed column of buffer memory 11 to register 14, and transfers whatever character is in the register 14 to the same column of the buffer memory.

Either or both the register 14 and the memory 11 have conventional gating that provides the delay necessary to effect this interchange; i.e. the data in one of these units is delayed in its transfer to storage in the other unit until the data in the latter unit is gated out to the former unit. For example, a register 14 constructed of synchronous flip-flops provides the desired timing capability. The transfer of keyed characters from register 14 to buffer memory 11 can be done via the unit 17 or in any other manner desired; conventional logic is available for this operation.

With further reference to FIG. 1, the RTC flip-flop 25 initiates and terminates the right cycle sequence for the right justification operation; in this sequence address register 35 addresses sequentially incrementing locations of buffer memory 11. An OR circuit 24 signals the RTC flip-flop to initiate this operation when the OR circuit receives either a signal from AND gate 26 or an enable ENBL signal. An AND gate 42, shown on the right side of FIG. 1, generates the ENBL signal when the left cycle sequence terminates. The AND gate 26 operates the OR circuit 24 to initiate the first right cycle sequence of a right justify operation when the gate 26 coincidentally receives both an $\overline{\text{MSP}}$ (not most significant position) signal and the JUST signal which the keyboard 10 develops when the operator depresses the right justification control key. The most significant position is usually the leftmost column in each field, i.e. this is the column that stores the most significant data character in a field. A program detector 27, shown in the lower right corner of FIG. 1, develops the $\overline{\text{MSP}}$ signal, and thereby enables the AND gate to respond to the depression of the right justification control key, at all times except when the detector senses that the memory buffer address gates 21 (FIG. 2) are receiving the address of the most significant column in a field of the memory.

The illustrated device provides this program detection operation by having additional cores in each memory buffer column, and storing therein bits for identifying the most significant column in each memory field. The program detector 27 receives the readout signals from these cores and, by use of conventional logic, develops either a MSP or $\overline{\text{MSP}}$ signal according to the value of these signals.

As also shown in FIG. 1, the output signal from the AND gate 26 is applied to the reset (clear to zero) input of a DUP flip-flop 30. This flip-flop controls the state of the eighth core in each column of the buffer memory 11. An OR gate 29 sets the DUP flip-flop when it receives either the ENBL signal, or the key signal, or a signal from an interchange logic unit 31.

Interchange logic unit 31 is connected between the assertion output of DUP flip-flop 30 and the connections for reading and writing in the D core in each column of buffer memory 11. The controlling inputs to interchange logic 31 are the RTC signal from flip-flop 25, the KEY signal from keyboard 10, and the R*d* and W*r* signals from the timing unit 49.

A gate 43 responds to the coincidence of the output signal from the gate 45 and the R*d* signal, to set the DUP flip-flop 30 when the D core in the addressed memory buffer column stores a ONE. Thereafter, a gate 44 stores in this core the prior state of the DUP flip-flop. Again, the timing for for this interchange can readily be using a synchronous DUP flip-flop 30 that delays responding to new input signals for an interval sufficient to encompass the interval between the R*d* and W*r* signals.

With further reference to FIG. 1, AND gates 32 and 36 both receive the RTC signal from RTC flip-flop 25. The other input to AND gate 32 is the assertion (ONE) output from DUP flip-flop 30, while the other input to AND gate 36 is the negation (ZERO) output from DUP flip-flop 30. The output signal from AND gate 36 sets an LTC flip-flop 37. The reset input of this LTC flip-flop is the RTC signal, and the RTC flip-flop is reset by the set output from the LTC flip-flop. This toggle connection between flip-flops 25 and 37 ensures mutually exclusive operation of right cycle and left cycle sequences.

The output signal from AND gate 32 causes an increment unit 34 to increment the address stored in address register 35. In addition, each time a data character entered via the keyboard has been transferred to the buffer memory 11, the keyboard actuates the increment unit 34 with an IAR signal. The increment unit 34, therefore, increments the address register 35 when data is being entered and also during the right cycle sequence of the right justify operation.

The assertion output from LTC flip-flop 37 is also connected to AND gates 41 and 42. The other inputs to AND gates 41 and 42 are $\overline{\text{MSP}}$ and MSP signals, respectively, from the program detector 27. With this arrangement, when the buffer memory is not at the most significant position of a memory field, the setting of the LTC flip-flop actuates AND gate 41. The resultant signal from the AND gate causes a decrement unit 40 to decrement the address stored in address register 35. The gate 41 decrements address register 35, illustratively once for each cycle of buffer memory 11, until a most significant position is reached, at which time detector 27 removes the $\overline{\text{MSP}}$ signal, thereby disabling gate 41. Further, the detector develops the MSP signal and, consequently, gate 42 develops the ENBL signal. The presence of ENBL signal signifies the end of left cycle sequencing and initiates, via OR gate 24, right cycle sequencing. The ENBL signal also actuates AND gate 15 to force a zero code into register 14, and operates OR gate 29 to set the DUP flip-flop 30.

Figure 3:
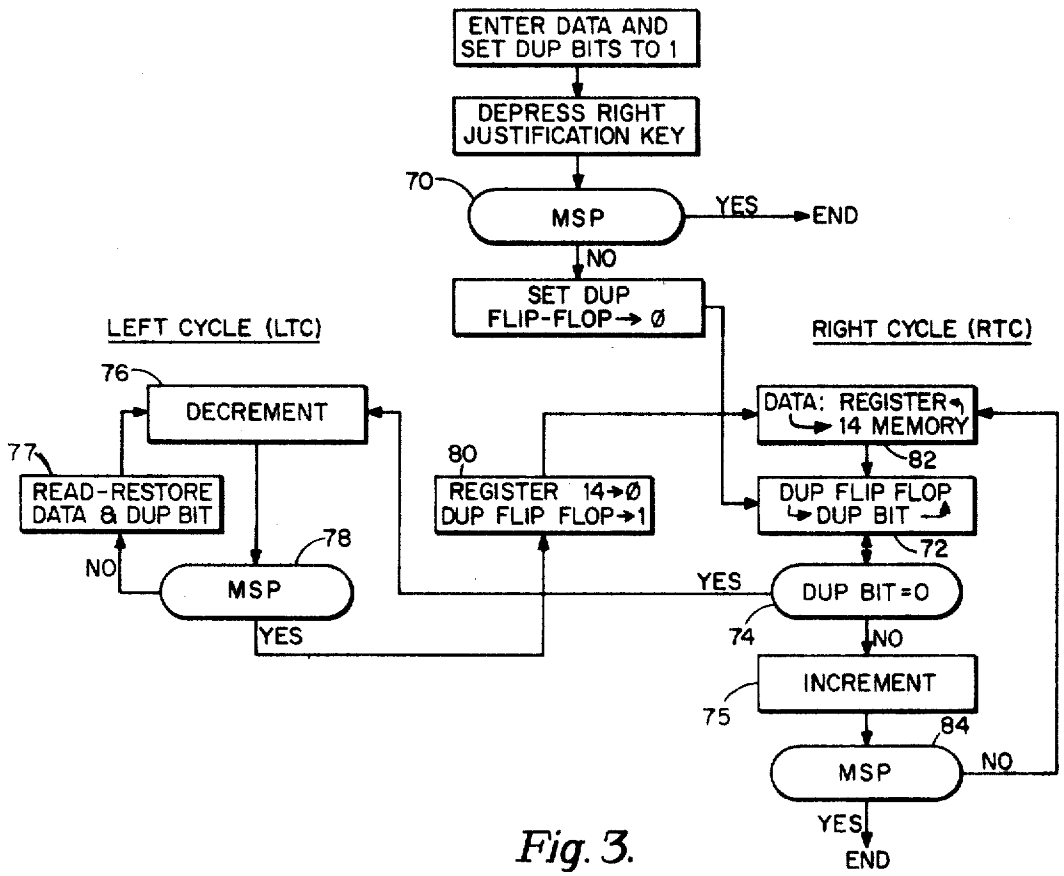
FIG. 3 is a flow chart showing the method steps used for right justification in accordance with the invention.

During operation of the illustrated key to memory device, data is initially entered through keyboard 10. Depressing a character key enters a corresponding code, determined by encoder 19, into register 14 and sets DUP flip-flop 30 to a one by virtue of the KEY signal applied to OR gate 29. The character code and the one state of DUP flip-flop 30 are then transferred to the addressed column of memory 11 under control of interchange control unit 17 and interchange logic unit 31, respectively. The flow chart of FIG. 3 shows this as the first action in a right justification operation.

The keyboard 10 further responds to operation of a data key generating the IAR signal after the above transfers have taken place. This signal increments address register 35 to address the next column of memory 11.

After all the character entries have been made for a field of memory 11 in this manner, the right justification key is actuated, commencing right justification sequencing.

The first step in the automatic right justification process depends on whether the program detector is producing the MSP or $\overline{MSP}$ signal. An MSP (most significant position) signal would signify that data has just been entered into the right end of a field and that the last entry had then spaced the memory address into the first and rightmost column of the next field; this being the most significant column of that field. Since the entered data is thus right justified on entry, no further processing is necessary and action stops. Referring to FIG. 1 this is accomplished when detector 27 inhibits AND gate 26. In the flow chart of FIG. 3 this is shown as a "yes" answer to decision box 70 and ends processing.

On the other hand, when the addressed field is not filled when the right justification key is depressed, $\overline{MSP}$ is present and AND gate 26 is enabled. Hence, gate 26 sets the RTC flip-flop 25 and resets the DUP flip-flop 30. As indicated in FIG. 1 interchange logic unit 31 responds to the resultant RTC signal to store in the addressed buffer-memory dup bit (flag bit) the zero-state responsive output signal from DUP flip-flop 30.

The coincidence of the RTC signal and the DUP flip-flop being reset activate AND gate 36 to set LTC flip-flop 37 thereby starting a left cycle sequence. The setting of the LTC flip-flop resets the RTC flip-flop. This sequence is shown in FIG. 3 where, after the DUP flip-flop is reset, the dup bit and DUP flip-flop interchange their contents (box 72), and, since the answer to decision box 74 is "yes," left cycle sequencing begins.

The function of the left cycle sequence is to locate the buffer memory column storing the leftmost, most significant, character in the memory field that is to be right justified. The illustrated key to memory device does this by "stepping" back through this memory field one column at a time and examining the program bits for each character until the most significant character is located, i.e. until the program detector produces an MSP signal. Accordingly, the first operation in the left cycle sequence is the decrementing of the memory address register by one column; see boxes 74 and 76 in the FIG. 3 flow chart. This is done by means of the gate 41 actuating the decrement unit 40.

The decremented address in address register 35 then identifies the column into which the last character was written. The significant operation during this memory cycle is that the program bits for the addressed column are read into the program detector, and then rewritten back in memory 11. In this way, the system checks whether the column being addressed is the most significant one. It should be noted, that the memory buffer contents remain unchanged in such a memory cycle during the left cycle sequencing. The master timing unit now executes a memory read-write cycle in which this column of the buffer memory is read into register 14 and then rewritten back into the same memory location. Simultaneously, the dup bit of the column is read into the DUP flip-flop 30 and rewritten in the buffer memory.

Assuming this first MSP sense (FIG. 3, box 78) in the left cycle sequence does not result in an MSP signal, as indicated in the flow chart with box 78, the read-restore takes place and the system again decrements the memory address register 37. A second MSP sense is then executed to examine the MSP/$\overline{MSP}$ status of the program bits in the column thus addressed.

As indicated in FIG. 3 with the sequential interconnection of boxes 76, 78 and 77, this left cycle sequencing continues until the system addresses the most significant column in the field being processed. This juncture corresponds to the "yes" decision from box 78, FIG. 3. The program detector signals this condition by removing the $\overline{MSP}$ signal and instead developing the MSP signal. Removal of the $\overline{MSP}$ signal disables gate 41, thereby terminating the decrement operation. Similarly, the MSP signal causes gate 42 to generate the ENBL signal, which signals the end of left cycle sequencing.

The ENBL signal enables gate 15, forcing a "zero" code into register 14, sets DUP flip-flop 30 to one, and starts a right cycle sequence by setting RTC flip-flop 25. The resultant RTC signal resets the LTC flip-flop. Thus, at commencement of the right cycle sequence, the memory address register 35 is addressing the column in memory 11 storing the leftmost, most significant, character in the field to be justified. Further, register 14 stores a zero-code, i.e. the same 6-bit code which encoder 19 develops when the "zero" key on the keyboard is depressed. Also, the DUP flip-flop 30 is set, the RTC flip-flop 25 is set, and the LTC flip-flop 37 is reset.

The right cycle sequence now actually performs the right justification. This is done by reading the field out of memory 11 a character at a time and rewriting it back in memory 11 shifted one character space, i.e. one memory column, to the right. This is repeated until a zero dup bit is detected. The increment-decrement cycle then continues until the characters are shifted to the right boundary of the field.

The first operation in a right cycle sequence is a memory cycle in which the leftmost character in a field of buffer memory 11 is read into register 14 and the zero-code is written into that memory column from register 14. The FIG. 3 box 82 summarizes this operation. As shown in FIG. 1, a gate 48 in the interchange control unit 17 handles the memory to register transfer under control of the timing unit 49 R*d* signal. Similarly, a gate 47 in the unit 17 handles the register to memory transfer when the W*r* signal is present. An OR gate 46 enables both gates for this operation in response to the RTC signal. The same memory cycle that effects the foregoing buffer memory-register interchange, interchanges the contents of the DUP flip-flop 30 and the memory buffer dup bit in the addressed column. This operation both tests the value of the dup bit and shifts it one column to the right, just as the associated character is shifted. In particular, during the memory read operation, a gate 43 in interchange logic unit 31 sets the DUP flip-flop 30 when the dup bit read from memory is a one. A gate 44 in the unit 31 applies the prior contents of the flip-flop to the memory during the write operation. (For the first right cycle the contents of the flip-flop is a zero, having been previously forced to the zero by JUST signal.) The RTC signal enables both gates by way of OR circuit 45.

When the DUP flip-flop switches to the set state in response to a one bit read from the buffer memory, its output signal actuates gate 32, already enabled by the RTC signal. In response, increment unit 34 advances the memory address register to the address of the next, lower-significant column. This is the increment operation indicated in the FIG. 3 flow chart as resulting from a "NO" decision from box 74. As discussed previously and shown in FIG. 3, when, at this juncture, the dup bit read from memory to the DUP flip-flop is a zero, rather than proceed to the increment operation, the flip-flop remains in the reset, zero, state and the system enters the left cycle sequence.

As indicated in the flow chart, FIG. 3, the system next determines whether the newly addressed column is a most significant position. This is done with a memory cycle in which the program cores are read into the program detector and then restored. When these cores identify that the column is the leftmost one in a subsequent field, the decoder generates the MSP signal and, as indicated in FIG. 3 with the "YES" decision from box 84, the right justification operation is complete.

On the other hand, if the newly addressed column is not a most significant one, the system recycles through another right cycle sequence.

To review the right justification operation described so far, and before considering further steps (i.e. the second cycle sequence), assume that upon completion of the left cycle sequence at the beginning of the right justification operation the contents of the register 14 and the data cores in a four-column memory buffer field were:

| Register 14: | Buffer field data |
|---|---|
| O | A B O O |

That is, register 14 contains the zero code and the field stores characters A, B and two zeros, in that order with the A being in the leftmost, most significant column of the field. Upon completion of a first right cycle sequence as just described with reference to the FIG. 3 boxes 82 through 84, the register and memory buffer contents would be:

| Register 14: | Buffer field data |
|---|---|
| A | O B OO |

That is, this first sequence transferred the leftmost character, A, to the register and stored the zero-code into the leftmost buffer column.

Further, upon being incremented (FIG. 3 box 75), the address register addresses the second column from the left of the four-column field. This in NOT the most significant column of a field and hence the decision from the FIG. 3 box 84 is a "-NO" and the system commences a second right cycle sequence. This sequence is identical to the first one described hereinabove. With reference to the present example, it changes the register 14 and data bits in the three-column memory buffer field to:

| Register 14: | Memory buffer data |
|---|---|
| B | O A OO |

That is, the interchange designated with FIG. 3 box 82 transfers the "E" character to register 14 and transfers the "A" character to the addressed column. The concurrent DUP flip-flop, dup bit interchange (FIG. 3 box 72), tests the value of the dup bit in this column and then replaces it with the one value read from the leftmost column dup bit during the first right cycle sequence and stored in flip-flop 30.

Continuing with the example of a four-column field the second right cycle sequence ends with the incremented address register addressing the third column from the left and with a "NO" decision from box 84. Accordingly, the system runs through a right cycle sequence. The interchange operations change the register and buffer memory contents to:

| Register 14: | Buffer field |
|---|---|
| O | O ABO |

However, the system still has not detected a zero dup bit, and hence proceeds to the increment operation of the sequence, which advances the address register to the fourth, rightmost column.

In the next, fourth, right cycle sequence, the register and memory data core contents remain unchanged by the interchange operations indicated with flow chart boxes 82 and 72, because zeros are transferred both ways. However, the fourth column has a zero dup bit. This causes the system to switch to left cycle sequencing, which decrements the address register back to the first, leftmost column of the four-column field.

The system next resumes right column sequencing with the following register and data core contents:

| Register 14: | Buffer field data |
|---|---|
| O | O A B O |

After the first right cycle sequence, this status is unchanged because the interchange (box 82) merely transfers zeros back and forth.

However, the second sequence changes this status to:

| Register 14: | Buffer field data |
|---|---|
| A | O O B O |

And the next sequence further chnnges the status to:

| Register 14: | Buffer field data |
|---|---|
| B | O O A O |

After the fourth sequence, the contents are:

| Register 14: | Buffer field data |
|---|---|
| O | O O A B |

Hence, the data in this field is now right justified. The ensuing increment operation advances the address register to the leftmost column of the next memory buffer field, i.e. the field adjacent the right end of the four-column field. This is a most significant column, and the "MSP decision" performed in accordance with flow chart box 84 now results in a "YES," i.e. the program detector now generates the MSP signal.

Thus, each right cycle operation inserts a zero code into the MSP column, moves the contents in the field one column to the right. This continues until an increment of address register 35 during right cycle operation (box 75, FIG. 3) encounters the MSP of the next field. This signals complete right justification and is shown in FIG. 3 by the "Yes" answer to decision box 84.

Figure 4:
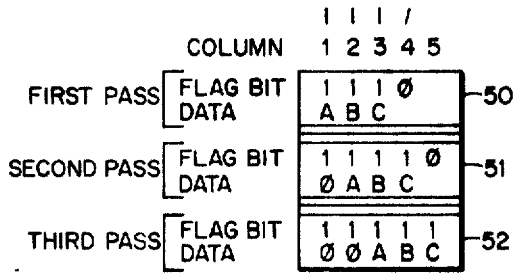

FIG. 4 illustrates the foregoing right justification process of FIG. 3 using a five-column field. The letters "A," "B," "C" represent three characters keyed into the field and the dup bit in each column is represented as a "$\phi$" or "1."

In the first pass 50, (a pass signifies all the steps through a right cycle termination) the three characters A, B and C are keyed into columns 1, 2 and 3 and the respective dup bits are set to "1." The right justification key is depressed and the dup bit in column 4 is set to $\phi$. On second pass 51, the column count is decremented to the first column of the field, here by three counts; register 14 is forced to zero, DUP flop 30 is forced to "1;" and register 14 and DUP flop 30 commence interchanging with memory 11. The column counter is incremented with each interchange until the "$\phi$" dup bit in column 4 is detected. The $\phi$ dup bit is left in column 4, column 5 is not processed, and the column counter again decrements to the first column in the field for third pass 52. Register 14 is again forced to zero, DUP flop 30 is again forced to "1" and the interchanging and incrementing is repeated. This time the address register is incremented to the MSP of the next field (i.e. column 6) and right justification is complete. The field is now ready for storage on the file memory (recorder 12 of FIG. 1).

Figure 6:
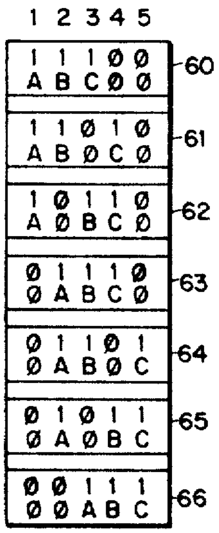
FIGS. 4, 5 and 6 depict in simplified form right justification operation in accordance with the invention for three embodiments of the invention.
Figure 5:
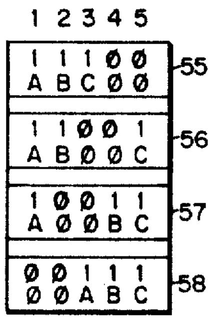

FIGS. 5 and 6 are two further examples of right justification using the flag bits of the present invention with slight circuitry modifications for proper sequencing.

In the example of FIG. 5 the data is entered on first pass 55 as in FIG. 4. Then on pressing the right justification key, the remaining columns are forced to zero character codes and a "$\phi$" dup bit.

On the second pass 56 the column counter is decremented until a "1" dup bit is detected (FIG. 5, column 3) and the character (C) is interchanged for a zero code while the dup bit is interchanged for a $\phi$ bit. The column counter then increments to the end of the field interchanging characters and dup bits at each successive column. This leaves character "C" and a "1" dup bit in column 5 and zero code characters in columns 3 and 4.

In the third pass 57 the column counter decrements to the "1" dup bit in column 2 and interchanges for a zero character code and a $\phi$ flag bit. Incrementing and interchanging are again performed until the "1" bit in column 5 is detected. Now characters B and C are in columns 4 and 5 and the dup bits in these columns are each "1."

Fourth pass 58 in FIG. 5 picks up the A character and moves it to column 3 in similar fashion, leaving zero codes in columns 1 and 2.

FIG. 6 is a third example requiring more passes but not necessarily more time since the passes are shorter. On first pass 60, data and dup bit are entered as in FIGS. 4 and 5. On pass 61 the column count is decremented to the "1" dup bit in column 3. Data and dup bit are interchanged for zero and respectively as in FIG. 5. The counter increments one column to column 4 and leaves the C character and "1" dup bit at column 4.

In pass 62 the B character and dup bit are moved over in similar fashion to column 3. Then in pass 63 the A character and dup bit are moved over to column 2 leaving a zero code and $\phi$ dup bit in column 1.

On pass 64, column 1 having been detected as an MSP, the counter increments until the $\phi$ dup bit in column 5 is detected. Then the data and dup bit from column 4 are interchanged for a zero code and $\phi$ and placed in column 5. In passes 65 and 66 the B and A characters are similarly moved over each being detected by the presence of the "1" dup bit.

When all data characters flagged by "1" dup bit have been moved to the right of the field, right justification is complete.

While FIG. 1 is a block diagram for carrying out the example of FIG. 4, small and obvious changes make it readily applicable to the examples of FIGS. 5 and 6. Other variations are contemplated as within the scope of the invention. For example, all dup bits could just as easily be complemented in any of the examples.

In summary, therefore, right justification of data in a buffer memory field is controlled by interchanging the data between the memory and a register, a character at a time. The sequence is controlled by sensing the condition of the dup bit in memory and also detecting the most significant position of the memory field. The method of the present invention is advantageous in that no additional large capacity storage is necessary to accomplish right justification and that the same memory bit can be used as was used in the verify mode of operation.

Thus, it is the intention to cover the invention broadly within the spirit and scope of the appended claims.

What we claim is:

1. Apparatus for justifying data in fields of a keyboard to memory device wherein an addressable buffer memory is connected between said keyboard and a file memory and wherein said keyboard includes data keys and control keys, said apparatus comprising:

a. transfer means including a register for entering data characters into consecutively addressed locations in a field of said buffer memory;
b. bistable means actuated by said data and control keys for setting flag bits in a field of said buffer memory that correspond to data locations and reset a flag bit in a memory location following the last entered character;
c. means to decrement the memory address to the most significant position of said field;
d. means to force a zero character into said most significant position of said buffer memory field and to transfer the data in said position to said register;
e. means to increment the memory address sequentially interchanging the contents of said buffer memory location that is addressed with the contents of said register until the memory location containing the reset flag bit is addressed; and `
f. means to detect said reset flag bit and cyclically cause a decrement-increment sequence to occur until the most significant position of a subsequent field is detected thereby signifying completion of the justification operation.

2. Apparatus as defined in claim 1 in which said bistable means is responsive to operation of said data keys to be set in one bistable state and is responsive to one of said control key to be selectively set in a second bistable state and further comprising means operative to exchange the state of said bistable device with a flag bit condition in said buffer memory.

3. Apparatus as defined in claim 1 wherein the flag bit is also capable of being set and reset during the verification procedure.

4. Apparatus as defined in claim 3 wherein said register is a shift register having a parallel input from said keyboard, a parallel output to said file memory, a serial input from said buffer memory and a serial output to said buffer memory and wherein said transfer means controls the interchange of data between said register and said buffer memory.

5. Apparatus as defined in claim 1 wherein said file memory is a magnetic tape recorder.

6. In a data recording apparatus having a keyboard including data and control keys, a buffer memory capable of sequentially storing entered data character-by-character, and a file memory into which recorded data is transferred; a method of right justifying data in a field of the buffer memory comprising the steps of:

a. setting a flag bit associated with each column of said buffer memory as a data character is entered into the respective column;
b. resetting the flag bit in the memory column location following the last entered data character;
c. incrementing and decrementing sequentially through the buffer memory and entering zero code characters to the left in the memory field by detecting the state of each respective flag bit and by detecting the most significant bit positions of the field of interest and the subsequent field to determine the extent of incrementing and decrementing, thereby completing right justification operation.

7. A method of right justifying data as defined in claim 6 wherein said incrementing and decrementing cycle comprising:

a. decrementing to the previous set flag bit;
b. interchanging the character indicated by said flag bit with a zero character, resetting the flag bit and temporarily storing the interchanged character;
c. incrementing until the most significant position of the following field is detected to thereby indicate the last column location of the operative field;
d. entering the interchanged character in said last column and setting the flag bit in said last column;
e. decrementing to the next previous set flag bit, interchanging with a zero, temporarily storing the interchanged character and resetting that flag bit;
f. incrementing to a set flag bit and entering the interchanged character; and
g. repeating the decrement-increment sequence until the character in the most significant bit position of the operative field has been interchanged with a zero character.

8. A method of right justifying data as defined in claim 6 wherein said incrementing and decrementing cycle comprises:

a. decrementing to the previous set flag bit, interchanging the character in that column with a zero character, storing the interchanged character and resetting the associated flag bit;
b. incrementing by one, entering the stored character and setting the flag bit;
c. repeating the previous steps until all characters have been incremented one position and the most significant position in the operative field contains a zero character; and
d. incrementing until the most significant position of the following field is detected to thereby indicate the last column location of the operative field, then repeating steps (a), (b), and (c) until right justification is complete.

9. In a data recording apparatus having a keyboard including data and control keys, a memory capable of sequentially storing data character-by-character, and mass storage means into which recorded data is transferred; a method of right justifying data in a memory field comprising the steps of:

a. setting a flag bit associated with each column of said memory as a data character is entered into the respective column;
b. resetting the flag bit in the memory column location following the last entered data character;
c. decrementing to the most significant position of said memory field;
d. exchanging the character in said most significant position for a zero code;
e. successively incrementing and moving each data character column-by-column until all data characters have been advanced one column;
f. repeating the three previous steps, if necessary, until the most significant position of the next field is encountered, thereby indicating completion of right justification operation.

10. A keyboard to memory device having
i. a keyboard having data keys and control keys,
ii. a file memory for storing coded representations of characters selected with said keyboard,
iii. a buffer memory for assembling said coded representations for transfer to said file memory, said buffer memory storing a group of one or more control digits in a location associated with the location storing said representation of a character, and
iv. a memory address register for addressing locations in said buffer memory, said device also having right justification apparatus comprising
A. logic means for controlling and detecting the condition of said group of control digits associated with each character stored in said memory buffer,
B. right cycle sequence means
1. connected with said memory buffer and said memory address register and said logic means, and
2. responsive to at least a first condition of said control digits to cause said memory address register to address successively incrementing memory buffer locations on successive memory buffer operations, and
C. left cycle sequence means
1. connected with said memory buffer and said memory address register and said logic means, and
2. responsive to at least a second condition of said control digits to cause said memory address register to address successively decrementing memory buffer locations on successive memory operations.

11. A keyboard to memory device as defined in claim 10 in which said memory buffer stores in each said group of control digits an indication whether the associated character is a most significant character and a flag indication.

12. A keyboard to memory device as defined in claim 11 in which
A. said buffer memory stores said character representations in locations arranged in fields of one or more locations, and
B. said keyboard
1. operates said logic means to store a first flag indication when a data character is keyed into the associated memory buffer location, and
2. operates said logic means to store a second flag indication in the control group location associated with the next-successively addressed character location after the last character location in a field thereof and storing a keyed character.